United States Patent [19]

Knoos

[11] 4,219,011
[45] Aug. 26, 1980

[54] MODULAR SOLAR ENERGY COLLECTOR SYSTEMS

[75] Inventor: Stellan Knoos, Rancho Palos Verdes, Calif.

[73] Assignee: AGA Aktiebolag, Lidingo, Sweden

[21] Appl. No.: 856,256

[22] Filed: Dec. 1, 1977

[51] Int. Cl.$^2$ .............................................. F24J 3/02
[52] U.S. Cl. ..................................... 126/444; 126/450
[58] Field of Search .............. 126/270, 271, 418, 429, 126/444, 445, 446, 448, 450; 165/170

[56] References Cited

U.S. PATENT DOCUMENTS

| | | | |
|---|---|---|---|
| 3,943,911 | 3/1976 | Yu | 126/271 |
| 4,003,363 | 1/1977 | Grossman | 126/270 |
| 4,054,124 | 10/1977 | Knoos | 126/270 |
| 4,136,669 | 1/1979 | Lane | 126/270 |
| 4,154,222 | 5/1979 | Yu | 126/270 |

Primary Examiner—William E. Wayner
Assistant Examiner—Harry Tanner
Attorney, Agent, or Firm—Fraser and Bogucki

[57] ABSTRACT

A readily fabricated, high efficient modular solar energy collector that may be arranged in a wide variety of arrays comprises a relatively small, typically but not necessarily rectangular, panel structure that is centrally coupled to an insulative support that may define an outlet conduit. In a specific example, a pair of coextensive, thermally conductive panels, the outer one of which preferably has a light absorptive black upper surface of low emissivity, defines flow paths directed laterally inwardly from side margins of the panel to a central mid-line region at which outlet apertures flow into a manifold region under the panel. The heated fluid in the manifold communicates with an outlet conduit within the support that is connectable at its respective ends to like conduits of adjacent modules. The centrally supported panels are sufficiently rigid to need no additional support, and freely expand and contract in response to temperature changes. An array of modules of this character may be mounted adjacent a single transparent cover of larger size, and for low ambient temperature regions may include an individual transparent cover for each module. The construction further permits swiveling of individual lines of modules so as to assume optimum angles to incident radiation. Despite the relatively small module size, high temperature differentials are achieved with high efficiency, and great flexibility is permitted in the arrangement of an array, which also can have good aesthetic appearance. All modules may be arranged to communicate with a heat exchanger system, such as an air-to-water heat exchanger.

19 Claims, 6 Drawing Figures

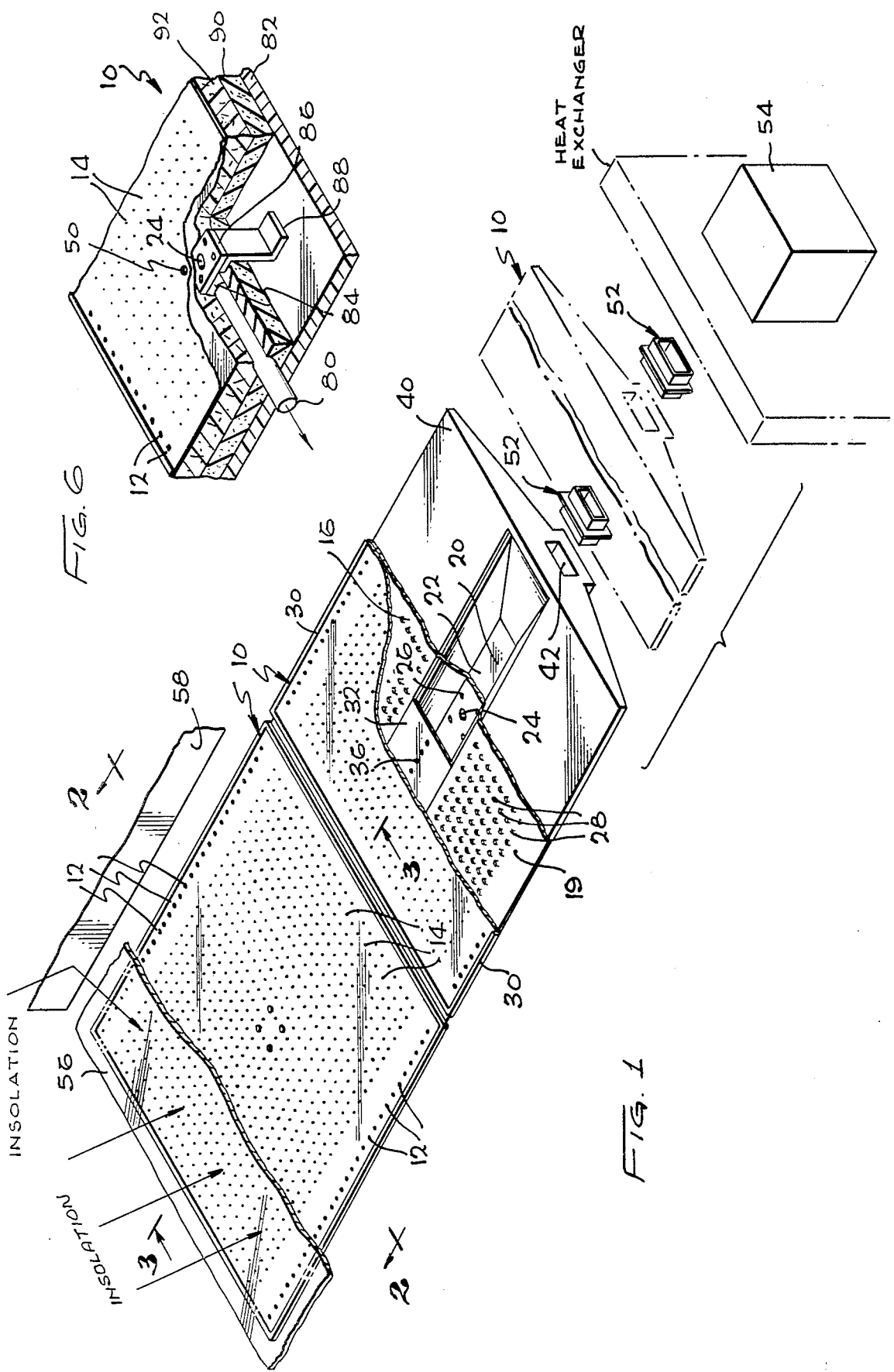

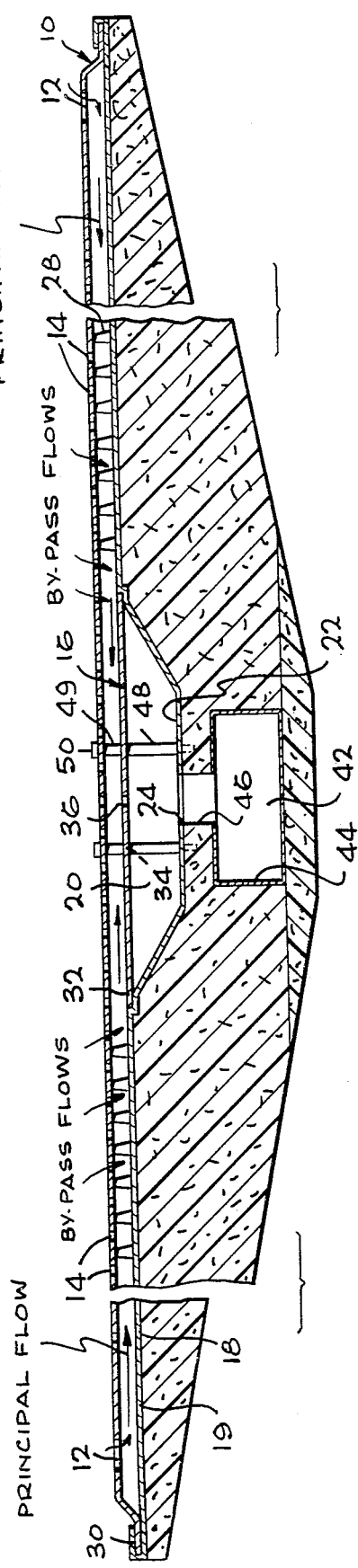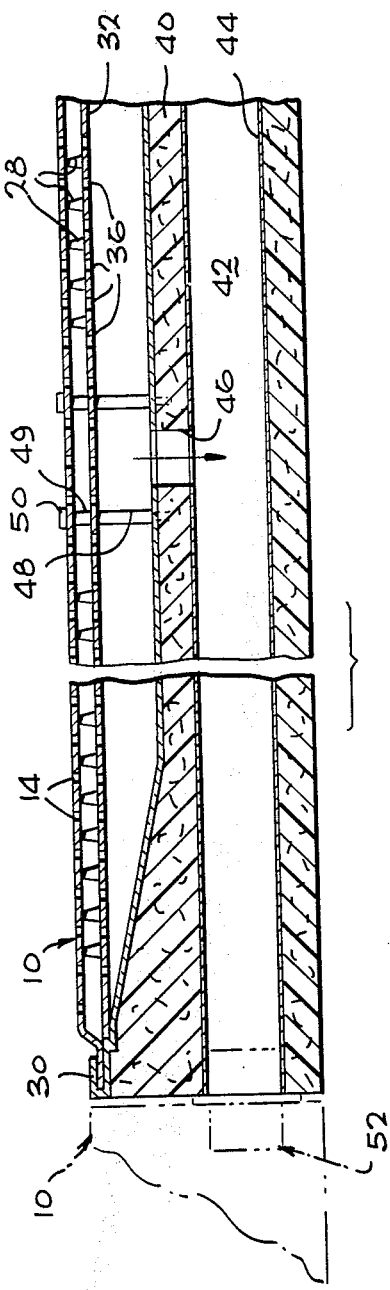

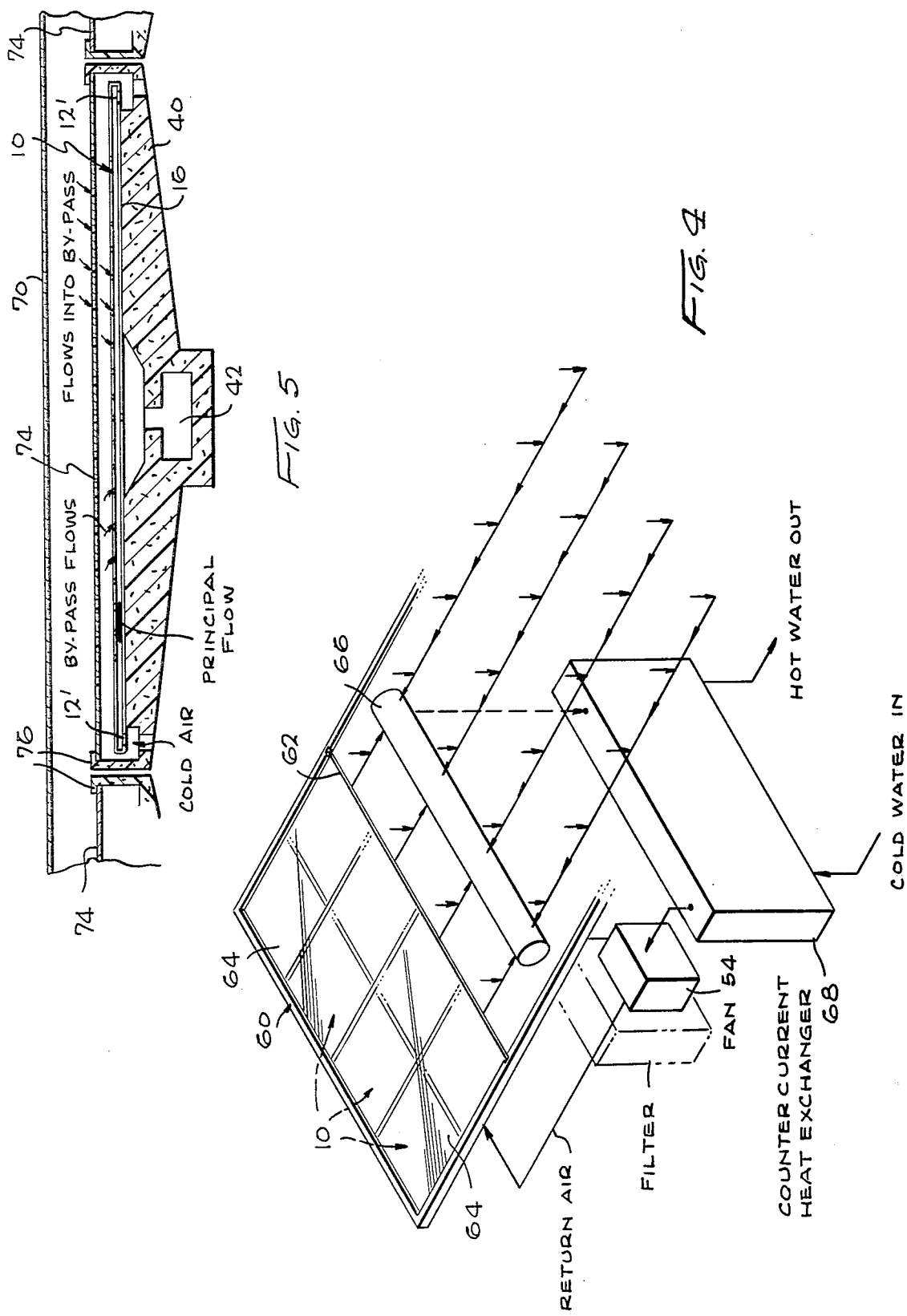

MODULAR SOLAR ENERGY COLLECTOR SYSTEMS

BACKGROUND OF THE INVENTION

A superior form of solar radiation collection system is disclosed and claimed in U.S. Pat. No. 4,054,124, which discloses a dual flow path system of high efficiency, short time constant and high effectiveness in suppressing free convection losses. The present invention is particularly well adapted for usage with the dual flow concept, but in addition is of general applicability to solar radiation collection systems of all kinds.

Most workers in the prior art have fabricated relatively large collector panels, typically of rectangular configuration and with widths of 1 to 2 meters and lengths of 1.5 to 2.5 meters and more. A film of air is then swept along the collector surface that is to be heated, which is typically a high conductivity sheet supported at its edges in a frame, along with a transparent cover and a rearwardly mounted insulative structure behind the panel. Usually water or other liquid is passed in heat exchange relation with the panel so that both the panel and the liquid conduit system are relatively heavy and a suitably rugged frame must be used. Above referenced U.S. Pat. No. 4,054,124 teaches a high efficiency system in which air or other gas may be used by, among other things, providing a thin sheet-like flow of gas beneath a thin planar collector. When fabrication problems, efficiency limitations and usage factors are considered in detail in this context, moreover, the basic configuration of a frame supported system has significant additional deficiencies. For example, a large aluminum panel that is adequately thin to be inexpensive is not physically self-supporting, and is so fragile as to be readily damaged during or after installation. Furthermore, such a large panel undergoes significant temperature expansion, and this must be accounted for unless buckling of the panel is to be accepted along with the consequent loss of efficiency. Furthermore, the weight and cost of the glass utilized in such a panel are substantial parts of the weight and cost of the overall device. It is also difficult to arrange a set of large panels into a suitable array so as to provide the heating capabilities needed for large installations.

SUMMARY OF THE INVENTION

Solar collector panels in accordance with the invention are relatively small modular units having a surface panel and a backing panel member coextensive therewith but closely spaced therefrom, to define an interior flow space, while at the same time including intermediate spacers and a peripheral seal that establish a cantilevered self-supporting structure. Flow paths for heated fluid within the flow space are directed laterally inwardly from the panel periphery toward a mid-line region, into communication with an underlying channel that forms part of the backing member. An insulative support structure is coupled to support the radiation panel structure in its central region, and also includes an interior conduit in communication with the manifold and providing a hot gas outlet for joinder to like serially disposed modules. The array of modules may be mounted under a large frame that is constructed solely for support of the transparent cover, but individual intermediate covers may also be mounted on the modules. This arrangement is readily fabricated, easily transported, quickly assembled or replaced, and can be arranged in a wide variety of arrays having pleasing aesthetic appearance if desired.

In accordance with more specific aspects of the invention, individual modules may be constructed to utilize the dual flow concept. For example, the modules may be of square configuration, with an array of inlet apertures along opposite sides substantially parallel to the mid-line region and with the bypass apertures in the interior region of the collector panel. With a selective coating on the collector surface, and using the dual flow principle, high temperature differentials can be realized in heating air or other working fluid, with very low time constants and with high efficiency, in a panel that is only 0.25 m² to 1 m². Further, the insulative support member may be configured as a central base portion enclosing a linear hot air conduit parallel to the mid-line axis, and in close communication with the manifold. Spacer and attachment elements may readily couple the collector panel to the insulative support member, thus aligning the collector panel but enabling the panel to move under thermal expansion free of peripheral restraint.

BRIEF DESCRIPTION OF THE DRAWINGS

A better understanding of the invention may be had by reference to the following description, taken in conjunction with the accompanying drawings, in which:

FIG. 1 is a perspective view, partially broken away, of modular collector panels in accordance with the invention;

FIG. 2 is a side sectional view taken along the lines 2—2 in FIG. 1 and looking in the direction of the appended arrows;

FIG. 3 is a side sectional view taken along the lines 3—3 in FIG. 1 and looking in the direction of the appended arrows;

FIG. 4 is a diagrammatic representation in idealized form of an array of solar radiation collector modules arranged in a system in accordance with the invention;

FIG. 5 is a side sectional view of a different modular system in accordance with the invention; and FIG. 6 is a fragmentary view, partially broken away, of yet another modular solar energy collection system in accordance with the invention.

DETAILED DESCRIPTION OF THE INVENTION

FIGS. 1-3 illustrate solar radiation collection panel modules in accordance with the invention, each having a square panel configuration of approximately 60 centimeters per side, thus a total collection area of 0.360 meters². In this example it is assumed that the module will be mounted in an array with other modules behind a large pre-existing glass panel. This is another advantage of the invention, in that an existing glass panel or window, which may be vertical, in a structure may be utilized as the transparent cover. The collector panel 10 itself is preferably a thin aluminum sheet, of less than 0.2 mm in thickness, and having a solar black selective coating of low infrared emissivity characteristic. The structure is arranged along a mid-line axis which essentially bisects the panel 10 and may be serially coupled to other modules along the same axis. Lines of cold air inlet apertures 12 (here 3 mm holes on 20 mm centers) adjacent each transverse edge of the panel and lying parallel to the mid-line axis allow cold intake air to enter under the collector panel 10. In the intermediate region of the panel 10 between the cold air inlet apertures 12 and the mid-line axis, bypass flow apertures 14 are provided, in accordance with the teaching of U.S. Pat. No. 4,054,125. The bypass flow apertures are of the order of 0.7 mm or less in diameter and on 20 mm centers. The collector panel 10 is held precisely spaced apart, by approximately 1.5 mm in this example, from a backing panel structure 16 that is fabricated in two sections. A principal section 18 of the backing panel 16 has planar outer segments 19 that are elongated parallel to the central axis, and an intermediate concave integral channel or manifold 20 symmetric with the central axis. The manifold 20 tapers with increasing depth from the adjacent longitudinal edges of the panel structure 16 to a central region, at which it has a flat bottom boss 22 in which are provided a central outlet aperture 24 and a number of mounting apertures 26. The planar segments 19 of the backing panel 16 also incorporate flat topped projections or mesas 28, here of approximately 3 mm in diameter and 1.5 mm in height, these mesas 28 being spaced on 20 mm centers in a rectangular pattern. The mesas 28 are physically coupled to the adjacent collector panel 10 by spot welding, ultrasonic bonding, brazing, high temperature adhesives or other conventional means, although adequate physical strength and integrity can be obtained by joinder at only a portion of the mesas 28. At the outer periphery of the backing panel 16, it is joined to the collector panel 10 with a peripheral seal 30. In this example the seal is fabricated by rolling over the edge of the backing panel 16 and joining it to the collector panel 10 by the same or different means as are used in coupling the mesas 28 to the collector panel 10.

Both the collector panel 10 and the backing panel structure 16 are thin aluminum sheets, here approximately 0.15 mm in thickness, which when joined in the manner shown provide a strong self-supporting structure that is resistant to bending and distortion, and defines a precisely spaced interior volume in which laminar flow is established and maintained despite temperature distortion effects arising from differential expansion. The backing panel structure 16 is completed by a central panel 32 of like thickness which is coextensive with the outline of the rectangular manifold 20. The central panel 32 includes a set of mounting apertures 34 in line with the corresponding apertures 26 in the backing panel, and a row of outlet apertures 36 along the mid line which pass heated air from the space under the collector panel 10 into the manifold 20. These outlet apertures are 3 mm in diameter and 20 mm apart in the example.

The lower surface of the backing panel 16 is mounted in registry with the matingly configured upper surface of an insulative base structure 40, here of double length so as to accept two collector panel modules. The insulative base structure 40 may be any of a wide variety of foam, plastic, composite or other insulative structures, but in this exemplification it is found advantageous to employ a low density fiber glass molded part. A preferred technique is to mold the part from a fiber glass blanket having resin coated fibers, with the resin being not fully cured or in a B stage. When molded to shape under temperature and pressure the part compresses, and the resin fully cures given good strength and insulative properties with a somewhat air permeable structure. The insulative base structure includes a central body parallel to the mid-line axis which incorporates a rectangular, low profile, collection channel 42 for air heated by the individual modules. The walls of this collection channel 42 are covered with a sealing material, such as aluminum foil 44, so as to limit leakage and fiber glass erosion. In line with the central outlet aperture 24 in the backing panel 16 in each module, the base structure 40 includes a short length opening for coupling the hot air from the manifold 20 into the collection channel 42. The base structure 40 may be made in one piece, or in different pieces that are joined together for ease of fabrication or lowering tooling costs.

The collector panel 10 and backing panel 16 together with the central panel 32 form a unitary structure which is mounted solely by one or more central supports on the base structure 40. Because the manifold 20 registers directly in the corresponding recess in the top surface of the base structure 40, no special positioning mechanism is required, and a wide variety of mechanical supports may be used. With the thin sheets used in the collector and backing panels 10, 16 respectively, however, it is found advantageous to employ spacers between them. In this example, spacer sleeves 48 are disposed between the flat boss 22 and the central panel 32, and other spacer sleeves 49 are disposed between the central panel 32 and the collector panel 10. Spacers could be formed integrally with the panels themselves by the use of deep drawing techniques if necessary. Self-tapping mounting screws extending between the panels 10, 32, 16 respectively within the spacer sleeves 48, 49 not only unify the panel module but become seated firmly but removably in the base structure 40. At each end of the base structure 40, in line with the collection channel 42, a short connector element 52, depicted only generally, may be used to provide a male-female connection to an adjacent base structure (not shown in FIGS. 1-3). A fan or blower 54, depicted only schematically, provides air flow for an array of modules, in communication with the collection channel 42. A bottom support structure (not shown), of planar or space frame character, or simply reinforcing tubes or rods, may be utilized to hold an array of modules in radiation receiving position.

Typically, the modules are placed behind a transparent cover 56, and the incident radiation may be augmented by a reflector panel 58. Both the transparent cover 56 and the reflector panel 58 are represented only generally, inasmuch as the modules can function in a wide variety of contexts, some of which are described further below. For present purposes it is assumed that the transparent cover 56 is a large glass window or wall panel in a self-supporting structure, and that the collector panel 10 is mounted in conventional fashion relative thereto to maximize insolation upon it.

Because of the relative thinness of the panels 10, 16 and 32, and the relatively small spacings between them, in contrast to the areal size of the panels, it must be expressly borne in mind that the drawings are necessarily not to scale.

The solar energy collection panel module of FIGS. 1-3 is arranged and functions in a fashion having distinct advantages. The centrally mounted, cantilevered collector panel 10 and the narrow interior flow channel which feeds to the central region provide substantially complete independence from thermal expansion problems. Cold air from the surrounding atmosphere is directed through the cold air inlet apertures 12 along the side margins of the collector panel 10 into the space between the panels 10, 16. As best seen in FIG. 2, and as described in the above-identified patent, principal flows are created between the collector panel 10 and the backing panel 16, moving laterally inwardly toward the mid-line region from each side. Bypass flows move across the insolated surface of the collector panel 10 to suppress free convection losses before moving through the bypass flow apertures 14 to join the principal flow. The laminar flow of heated air in the interior channel between the panels 10, 16 is directed through the outlet apertures 36 in the central panel 32 into the manifold 20 of the backing panel structure, then through the central outlet aperture 24 and the adjacent short length opening 46 into the collection channel 42. Thus there is a substantially unrestricted flow path and a short path length between the principal flow channel and the collection channel 42. The result is that pressure losses are extremely low, and little energy is required to move air through a substantial array of panels. A simple fan 54 having less than 10 watt output therefore suffices for a typical array of 32 modules.

During heating of the collector panel 10, there is no restraint on thermal expansion of the centrally mounted panel structure. The backing panel 16 is at a slightly lower temperature, of the order of 10° C. lower, but with a substantial number of couplings at the mesas 28, the thermal stresses between the panels 10, 16 can readily be withstood. With thin aluminum panels as described the total mass of the metal portions of the structure is less than approximately 300 grams, and the insulative base structure 40 weighs less than 1 kilogram, so that individual modules and groups of modules can be transported and manipulated with ease by a single individual. The thin aluminum plates that is used need not be of first quality inasmuch as pinholes have no significant adverse effects, so that the panels can be of extremely low cost. Nonetheless, high performance characteristics are achieved because the thin sheet-like flow of air and the precisely spaced channel under the collector panel 10 provide very effective heat collection and transfer into the insulated collection channel 42. Temperature differentials of in excess of 120° C. can be provided with this structure, and with high efficiency and high speed response (less than 1 minute) to insolation conditions. Further aspects of the system pertaining to the dual flow concept may be appreciated by reference to a concurrently filed application of the same inventor designated "Solar Energy Collector", and assigned to the same assignee as this invention.

These small and compact modules, which can be symmetrical as shown in this example, can be mounted and used independently of a glass or other transparent cover system. Because they can provide serial coupling of successive modules, row and column arrangements of virtually arbitrary character can be devised, with or without significant spaces between them. Thus the system has architectural adaptability, and cannot only be configured to occupy a given insolated space but can be arranged to permit light to pass through into an interior area. Single glass, double glass and other arrangements may be employed, with independent mounting or by mounting the glass to the insulative structure, one example of which is described below. The panels are particularly well adapted to being placed adjacent a vertical transparent panel or system, and usage of a reflective cover substantially improves efficiency in gathering solar energy. For example, in northern latitudes in which the sun is at a low angle through the winter months, a slightly declining reflector panel substantially increases the amount of insolation falling upon the collector system.

The ability to heat air directly and transfer the air into a central region before heat exchange with a water medium, if such is to be used, has further significant advantages in addition to the basic freedom from material costs and structural weight. If there are imperfections in any localized region of a panel, or damage to a panel, the only effect is that a cold spot appears in that region of the panel, because thermal energy collection in surrounding areas is substantially unaffected. Leakage does not cause significant damage as in a water handling system. There is no danger of freezing of operative components during long periods in which no solar radiation is present.

A typical arrangement of a system in accordance with the invention comprising an array of modules is shown in FIG. 4. As seen therein, rows of individual modules are mounted beneath an independent frame system 60 having lateral channels 62 which retain individual glass covers of a selected size, such as 1.2 meters by 2.4 meters. Thirty-two modules are thus mounted on four hot air collection channels, all of which feed to a central manifold 66 which is coupled to one side of a countercurrent heat exchanger 68 that is mounted below the collector system. The heated air passes into an inlet through one set of interior channels within the heat exchanger, through a blower or fan 54, and an associated filter, if desired. It is returned to the volume occupied by the array, for circulation around the individual modules and subsequent recirculation through the collector panels. The water fed into the heat exchanger is, after heating, passed to an insulated storage system or directly to a utilization device, as desired. The heat exchanger is thus conveniently placed below the array of collector modules, and if it is not initially disposed within an insulated residence or other structure, is the only portion of the system which needs to be insulated to prevent freezing of the water. That side of the heat exchanger in contact with the insulation side of the modules is already insulated.

In some instances it may be desired to shift the angles of the panels for better collection efficiency, either within a given day or in relation to average elevation over the year. To this end a line of the light weight modules need simply be spaced adequately from the transparent cover and mounted at each end on rotary couplers which provide support but prevent hot air loss. Then the panels can be shifted manually or under servo or other control about a vertical or horizontal axis so as to change in azimuth or elevation.

The low pressure drop in an entire multi-module array is another significant advantage of the system, being in the range of 50-100 Pascal. With pressure drops in the individual modules of 80 Pascal as previously stated, the drop in the entire system for a 32 module array is only about 100 Pascal, which permits a small, quiet low cost blower to be used.

One example of the versatility which is inherent in this modular construction is provided by the system of FIG. 5, in which a number of modules are disposed under a primary cover glass 70, held in a frame structure 72. Intermediate covers 74, a different one for each module, are mounted in closely spaced-apart relation to the collector panel surface 10 by support arms 76 coupled to the base structure 40. Spaces between the support arm 76, or apertures in them, permit flow of cold inlet air into inlet apertures 12' on the under side of the backing plate 16, for passage into the principal flow path. The intermediate covers 74 are thin Teflon sheets that are transparent to insolation but have small perforations to permit air to flow down into the bypass region. This construction demonstrates that an intermediate cover can be mounted separately and also in modular fashion relative to the collector panel members. Further the intermediate cover need not be of glass, and can be arranged to provide a separate air source for the bypass flow. In the region of the periphery of the collector panel the air is relatively cold inasmuch as it has not yet swept over a heated surface, so that it is not necessary to insulate the protruding tips and the inlet apertures can be placed underneath or on top relative to the collector panel. It may also be desired in some instances to place a peripheral seal between the intermediate glass cover 74 and the collector panel 10 for a portion of the periphery, to limit hot air leakage.

Preferably, the intermediate cover is at a spacing of from 5 to 15 mm from the collector panel surface. It is also feasible to use other thin plastic membranes as intermediate covers, either for individual modules as shown in FIG. 5 or by suspending the membrane within the frame 72 across a number of modules. More than one intermediate transparent cover or external cover may also be used.

In the system of FIG. 6, the solar collector module is constructed as previously described, but the insulative base structure is arranged with the module as well as a hot air collection pipe 80 or other conduit mounted on a base support 82, and with one or more intermediate insulation layers. As seen in FIG. 6, the hot air pipe includes, at the hot air outlet from the manifold 20 region, and about the outlet aperture 24, a boss 84 with an extending side bracket 86. The module is mounted to the boss 84, which incorporates apertures to receive mounting screws or studs in the fashion previously described, while the pipe 80 as well as the module are supported from the base 82 by a riser 88. The space between the base 82 and the under side of the module is filled with insulation, here an under layer of foam 90 and an uppermost layer of fiber glass 92, to conform to the varying configurations on the under side of the module and to encompass the pipe. The same principles are maintained in this structure, in that the entire body of the panel is freed for expansion while being centrally supported, and that it remains in close juxtaposition to the underlying pipe.

Those skilled in the art will appreciate that the pipe in the example of FIG. 6 and in the prior examples may be of rectangular or circular form, as desired, and that it need not be parallel to the mid line between the cold air edges of the module, but can lie at 90 degrees thereto. In FIG. 6, this is accomplished merely by a shift of the position of the support riser. In the arrangement of FIGS. 1-3, a change in the insulative structure would be needed to insulate the conduit, which could be separately defined or incorporated in the base. It will also be recognized that by coupling the module to the pipe 80 as shown in FIG. 6 it is not necessary to provide a riser support in the manner shown, inasmuch as the pipe 80 can be supported from underneath.

Although there have been described above and illustrated in the drawings various solar energy collection modules in accordance with the invention, it will be appreciated that the invention is not limited thereto but encompasses all modifications and variations within the scope of the appended claims.

What is claimed is:

1. A modular solar energy collection panel comprising:
   areal collector means having a pair of coextensive, closely spaced apart and substantially parallel panels providing a principal fluid flow path therebetween, and further including centrally disposed manifold means disposed on the opposite side from the panel face that is to receive solar radiation;
   conduit means disposed adjacent to said manifold means and coupled to receive heated fluid therefrom; and
   support means coupled to a central portion of said collector means in the region of said manifold means,
   wherein said collector means is independently cantilevered from the central support, and wherein said system further includes insulation means disposed adjacent the rear face of said collector means, and wherein said collector means is free to expand in response to temperature relative to said insulation means.

2. A modular solar energy collection panel comprising:
   areal collector means having a pair of coextensive, closely spaced apart and substantially parallel panels providing a principal fluid flow path therebetween, and further including centrally disposed manifold means disposed on the opposite side from the panel face that is to receive solar radiation;
   conduit means disposed adjacent to said manifold means and coupled to receive heated fluid therefrom; and
   support means coupled to a central portion of said collector means in the region of said manifold means,
   wherein said collector means includes a top collector panel and backing panel means, said backing panel means including integral manifold means, and central plate means coextensive with said manifold means and including outlet aperture means.

3. The invention as set forth in claim 2 above, wherein said backing plate means includes projection means coupled to said collector means and providing a predetermined spacing therefrom.

4. A modular solar energy collection panel comprising:
   areal collector means having a pair of coextensive, closely spaced apart and substantially parallel panels providing a principal fluid flow path therebetween, and further including centrally disposed manifold means disposed on the opposite side from the panel face that is to receive solar radiation;
   conduit means disposed adjacent to said manifold means and coupled to receive heated fluid therefrom; and
   support means coupled to a central portion of said collector means in the region of said manifold means,
   wherein said collector means is centrally disposed above a mid line, and said collector means is substantially rectangular in form and includes air inlet means along edges parallel to and spaced apart from the mid line.

5. A solar collector panel module comprising:
   a collector panel having a surface to receive radiation;
   backing panel means disposed proximate and substantially coextensive with the collector panel on the back side thereof relative to the side to receive radiation, said backing panel means being peripherally coupled to the collector panel;

means providing fluid flow between said collector panel and backing panel means along paths substantially normal to a mind line bisecting the backing panel means;

insulative support means substantially coextensive with and proximate said backing panel means and including a fluid collector channel facing said backing panel means along the mid-line region and in communication with fluid flow between said collector panel and backing panel means, and further including conduit means in communication with said fluid collector channel; and means disposed in an interior area of said insulative support means for coupling to and supporting said collector panel and backing panel means.

6. The invention as set forth in claim 5 above, wherein said backing panel means includes a plurality of protrusions engaging and coupling to said collector panel and defining a predetermined spacing therefrom.

7. The invention as set forth in claim 6 above, wherein said collector panel and backing panel means are substantially rectangular in shape and wherein said collector panel has a selective radiation surface of low reradiation characteristic.

8. The invention as set forth in claim 7 above, wherein said backing panel means comprises a two-section member, a first of which defines the outer portion and includes an interior integral channel portion, and the second of which is a central panel coextensive with the interior channel portion.

9. The invention as set forth in claim 8 above, wherein said insulative support means further comprises means for coupling to and supporting said collector panel and backing panel means in spaced apart relation.

10. The invention as set forth in claim 9 above, wherein said insulative support means comprises a central body structure encompassing the fluid collector channel and tapering arms extending laterally therefrom to the side peripheries of the panel module.

11. The invention as set forth in claim 10 above, including in addition sealing means disposed about the periphery of the conduit means within said insulative support means.

12. The invention as set forth in claim 11 above, wherein said collector panel is of less than one square meter in area, and wherein said collector panel and backing panel means are approximately 1.5 millimeters in thickness.

13. The invention as set forth in claim 12 above, wherein said collector panel is of square configuration and approximately 0.6 meters per side.

14. A modular solar energy collector system comprising:

solar panel means and backing plate means that are closely spaced apart and substantially coextensive and including means for providing fluid flows therebetween laterally to outlet means along a bisecting mid-line region and manifold means along the mid-line region adjacent said backing panel means;

insulative support means centrally coupled to and substantially coextensive with said solar panel means and backing panel means; and outlet conduit means in communication with said manifold means and extending along said mid-line region, whereby a series of like modules may be assembled by in-line connection of the outlet conduit means.

15. The invention as set forth in claim 14 above, wherein said insulative support means includes said outlet conduit means interior thereto.

16. The invention as set forth in claim 15 above, wherein said insulative support means comprises a central body having extending arms of tapered cross section extending from the mid-line region.

17. The invention as set forth in claim 14 above, wherein said support means is coupled to said solar panel means and backing plate means, and said outlet conduit means, and wherein said insulative support means are disposed below the rear surface of said backing plate means and about said outlet conduit means.

18. A solar energy collector panel system capable of use as an individual module in a modular assembly comprising:

a pair of closely spaced apart, substantially coextensive panels, an upper one of which comprises an insolation receiving surface and incorporates peripheral means for enabling air to flow laterally inwardly between the panels to a central region such that the air is heated during the flow;

manifold means centrally disposed at the underside of the lower panel and in communication with and receiving the heated air from between the panels;

insulative means disposed adjacent the underside of the lower panel and being substantially coextensive therewith;

support means coupling the insulative means to the central region of the panels such that the panels are supported with the outer margins of the panels free to expand and contrast with temperature; and outlet conduit means coupled to and in communication with said manifold means along the underside of the lower panel.

19. The invention as set forth in claim 18 above, wherein said pair of panels further includes means therebetween for maintaining the close spacing.

* * * * *

UNITED STATES PATENT AND TRADEMARK OFFICE
CERTIFICATE OF CORRECTION

PATENT NO. : 4,219,011
DATED : August 26, 1980
INVENTOR(S) : Stellan (NMI) Knoos It is certified that error appears in the above-identified patent and that said Letters Patent are hereby corrected as shown below:

Column 3, line 4, "4,054,125" should read --4,054,124--. Column 9, line 6, after "a" and before "line", "mind" should read --mid--. Column 10, line 49, after "and" and before "with", "contrast" should read --contract--.

Signed and Sealed this

Twenty-fifth Day of November 1980

[SEAL]

Attest:

SIDNEY A. DIAMOND

Attesting Officer

Commissioner of Patents and Trademarks